US012742507B2

(12) United States Patent
Si et al.

(10) Patent No.: US 12,742,507 B2
(45) Date of Patent: Sep. 22, 2026

(54) VALVE SEAT ASSEMBLIES FOR RELIEF VALVES

(71) Applicant: Emerson Automation Solutions Final Control US LP, Houston, TX (US)

(72) Inventors: Jinzhi Si, Katy, TX (US); Ashish Shaukat Kadiwal, Richmond, TX (US); Mehdi Pazoki, Katy, TX (US); Archer Zhou, Shanghai (CN); Baisen Ye, Shanghai (CN)

(73) Assignee: Emerson Automation Solutions Final Control US LP, Houston, TX (US)

( * ) Notice: Subject to any disclaimer, the term of this patent is extended or adjusted under 35 U.S.C. 154(b) by 0 days.

(21) Appl. No.: 19/030,123

(22) Filed: Jan. 17, 2025

(65) Prior Publication Data

US 2026/0071689 A1 Mar. 12, 2026

(30) Foreign Application Priority Data

Sep. 9, 2024 (CN) ......................... 202411259276.1

(51) Int. Cl.

| | |
|---|---|
| ***F16K 17/04*** | (2006.01) |
| ***F16K 17/06*** | (2006.01) |
| *F16K 25/00* | (2006.01) |
| *F16K 27/02* | (2006.01) |
| *F16K 27/08* | (2006.01) |

(52) U.S. Cl.

CPC .......... *F16K 17/0466* (2013.01); *F16K 17/06* (2013.01); *F16K 25/00* (2013.01); *F16K 27/0209* (2013.01); *F16K 27/08* (2013.01)

(58) Field of Classification Search

CPC ...... F16K 17/0466; F16K 17/06; F16K 25/00; F16K 27/0209; F16K 27/08

USPC ......... 137/535, 315.11, 315.31, 488, 516.21; 251/186, 322, 323, 362, 363

See application file for complete search history.

(56) References Cited

U.S. PATENT DOCUMENTS

| | | | | | |
|---|---|---|---|---|---|
| 763,208 | A * | 6/1904 | Robinson | F16K 3/188 | 137/906 |
| 2,573,623 | A * | 10/1951 | Stover | F16K 1/487 | 251/85 |
| 2,666,448 | A * | 1/1954 | Garretson | F16K 1/34 | 301/5.1 |
| 2,754,841 | A * | 7/1956 | Eddy | F16K 17/0466 | 137/499 |
| 3,422,840 | A * | 1/1969 | Brumm | F16K 17/0493 | 137/540 |
| 3,520,326 | A * | 7/1970 | Bowen | F16K 17/0433 | 137/477 |
| 3,945,607 | A * | 3/1976 | Dashner | F16K 17/0486 | 251/360 |
| 4,065,029 | A * | 12/1977 | Chernock | F23Q 2/163 | 222/3 |
| 4,130,130 | A * | 12/1978 | Stewart | F16K 17/0433 | 137/478 |

(Continued)

*Primary Examiner* — Minh Q Le

(74) *Attorney, Agent, or Firm* — Hanley, Flight & Zimmerman, LLC

(57) ABSTRACT

Valve seat assembly for relief valves are disclosed. An apparatus includes a valve seat, a retainer ring, and a spindle. The valve seat has a seating surface and a stem. The retainer ring has a central opening to receive the stem of the valve seat. The retainer ring and the valve seat to couple via a press-fit connection. The retainer ring to couple to the spindle via a clearance fit connection.

19 Claims, 12 Drawing Sheets

(56) References Cited

U.S. PATENT DOCUMENTS

| | | | | |
|---|---|---|---|---|
| 4,226,261 | A * | 10/1980 | Ekeleme, Jr | F16K 17/082 137/477 |
| 4,245,667 | A * | 1/1981 | Braukmann | F16K 17/168 137/543.13 |
| 4,858,642 | A * | 8/1989 | Fain, Jr. | F16K 17/0433 137/474 |
| 5,064,169 | A * | 11/1991 | Alberts | F16K 17/0433 137/488 |
| 6,668,853 | B2 * | 12/2003 | Dean | F16K 17/04 137/315.27 |
| 6,973,941 | B2 * | 12/2005 | Baumann | F16K 47/04 137/625.37 |
| 7,469,714 | B2 * | 12/2008 | Muller | F16K 17/06 137/540 |
| 8,534,308 | B2 * | 9/2013 | Nunez | F16K 17/162 137/71 |
| 10,502,338 | B2 * | 12/2019 | Wuestefeld | F16K 17/04 |
| 11,614,176 | B1 * | 3/2023 | Jassim | F16K 17/0413 137/514 |
| 2002/0029808 | A1 * | 3/2002 | Friend | F16K 17/06 137/551 |
| 2006/0157116 | A1 * | 7/2006 | Martin | F16K 17/0426 137/514.5 |
| 2011/0284092 | A1 * | 11/2011 | Spencer | F16K 25/00 137/528 |
| 2016/0201809 | A1 * | 7/2016 | Varga | F16K 1/36 251/84 |

* cited by examiner 232
106
100
230
206
234
236
238
226
228
240
202a
220
202
208a
202b
200
102
208
212
214
210
110
218a
216
222
204
218
224
104
104a
108

VALVE SEAT ASSEMBLIES FOR RELIEF VALVES

FIELD OF THE DISCLOSURE

This disclosure relates generally to process control devices and, more particularly, to a valve seat assemblies for relief valves.

BACKGROUND

Pressure relief valves are often used in systems to relieve pressures that exceed a desired set pressure. Some types of pressure relief valves include direct acting relief valves. A direct acting relief valve includes a poppet held on a seat by a spring. The side of the poppet opposite the seat is exposed directly to the high-pressure fluid. When the pressure of the fluid exceeds a set-pressure, a force of the high-pressure fluid pushes the poppet off the seal to open the valve.

SUMMARY

A disclosed example apparatus for use with a relief valve includes a valve seat, a retainer ring, and a spindle. The valve seat has a seating surface and a stem. The retainer ring has a central opening to receive the stem of the valve seat. The retainer ring and the valve seat to couple via a press-fit connection. The retainer ring to couple to the spindle via a clearance fit connection.

An example relief valve includes a valve body defining a fluid flow passageway between an inlet and an outlet. The valve body defines a spring chamber to receive a biasing element, a nozzle positioned in the valve body and defining an orifice, and a valve seat assembly interposed in the fluid flow passageway. The valve seat assembly is to move relative to the orifice to control fluid flow through the fluid flow passageway. The valve seat assembly includes a valve seat, a retainer ring and a spindle. The valve seat is coupled to the retainer ring via a press-fit connection. The retainer ring is coupled to the spindle via a clearance connection. The retainer ring allows the valve seat to self-align relative to the orifice.

An example valve seat assembly for a relief valve includes a seating surface having a circular shape, a stem extending from the seating surface, and a tapered surface extending between the stem and the seating surface. The valve seat assembly includes a retainer ring. The retainer ring has an opening to receive the stem. The valve seat and the retainer ring to couple via a press-fit connection between the valve stem and an inner surface defined by the central opening of the retainer ring.

Figure 1:
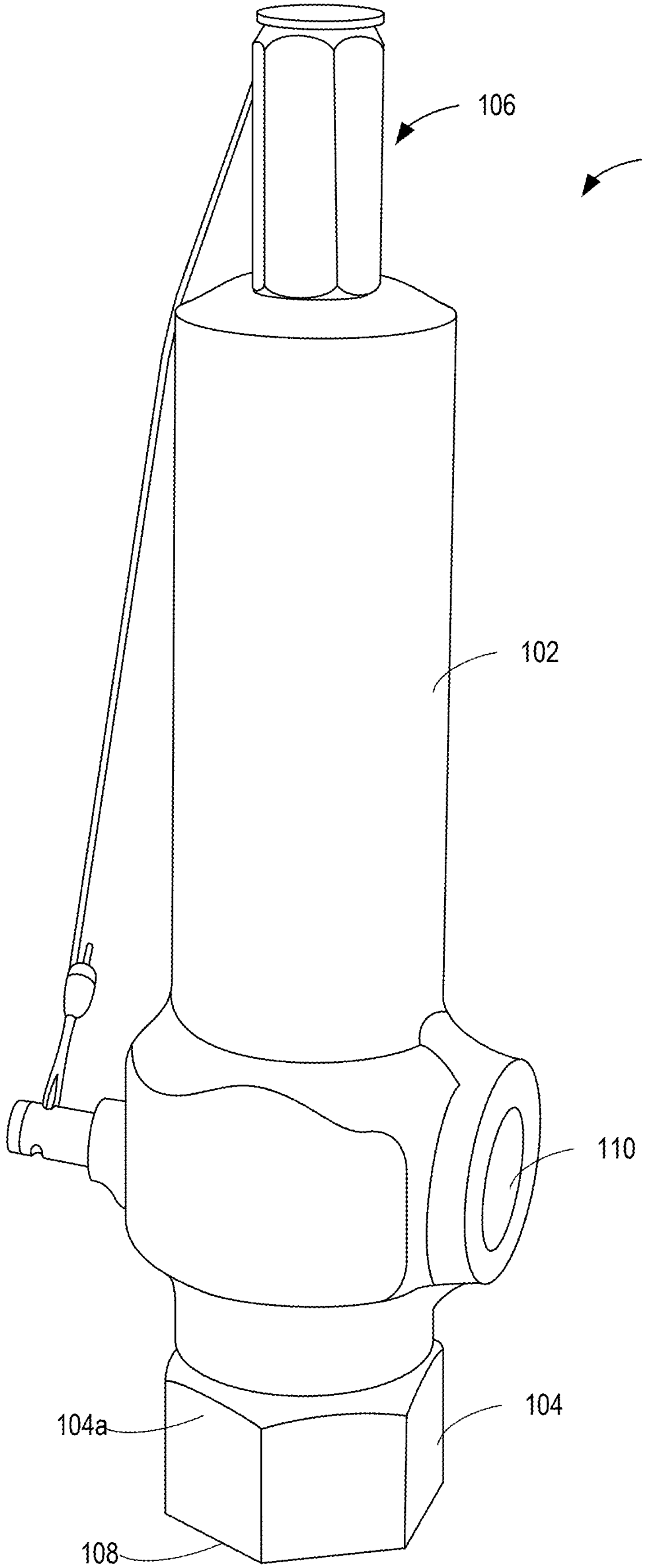
FIG. 1 illustrates an example relief valve in accordance with teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Spring-operated pressure relief valves are used extensively in systems and vessels for over pressure protection. Fluid valves (e.g., spring operated pressure-relief valves) employ a spring to bias a valve seat toward a seating surface (e.g., a closed position). Operation of a spring-operated, pressure-relief valve involves compressing the spring a predetermined amount to control an opening point or a set pressure of a valve seat via a closing force. When the force exerted by a fluid on the valve seat is equivalent to and/or exceeds the closing force of the spring, the valve moves to an open position to allow fluid flow through the valve. An additional increase in fluid pressure can cause further opening of the valve. Conversely, a decrease in fluid pressure below the set pressure leads to closure of the valve to prevent or restrict fluid flow through the valve.

To operatively couple the valve seat and the biasing element, pressure relief valves include a spindle or plug. Specifically, the valve seat couples to the spindle via a fastener (e.g., a screw). However, employing a fastener to couple the valve seat and the spindle increases manufacturing complexity when reducing a size (e.g., a diameter) of the fluid valve. For example, fluid valves having diameters less than one inches (e.g., 0.5 inches) reduce an amount of space available on the spindle to machine an annular groove in the spindle that is located adjacent the valve seat. The annular groove is needed to increase a volume of an area adjacent to an orifice of the pressure relief valve to improve (e.g., increase) an opening speed of the pressure relief valve. Additionally or alternatively, pressure relief valves having fasteners to couple the valve seat and the spindle can be limited to process fluid pressure applications having certain pressures. For example, fasteners may be limited to process fluids having pressures that do not exceed, for example, ten kilopounds per square inch (kpsi) (e.g., approximately 68.9 megapascals (MPa), 12 kpsi, 15 kpsi, etc.).

Examples disclosed herein facilitate manufacturing, assembly, and/or operating performance of fluid valves (e.g., pressure relief valves). Specifically, example valve seat assemblies disclosed herein employ a valve seat coupled to a retainer ring via a press-fit connection (e.g., via a direct interference fit connection (see FIG. 6C) or indirectly by a clearance fit connection (see FIG. 6D)). Example retainer ring and valve seat assemblies disclosed herein couple to a spindle. Thus, example valve seats disclosed herein are not coupled to the spindle using a fastener such as a screw. Additionally, example valve seats disclosed herein can float relative to the spindle. To this end, example retainer rings disclosed herein guide and/or centrally locate the valve seat relative to a seating surface to improve sealing capability (e.g., seat tightness) of the fluid valves (e.g., pressure relief valves). The retainer ring allows the valve seat to move relative to a longitudinal axis of the valve seat to self-align on a seating surface. Thus, the valve seat is a floating or self-aligning valve seat that centrally and/or coaxially aligns with a seating surface of an orifice and/or valve body.

FIG. 1 illustrates an example relief valve 100 (e.g., a pressure relief valve, a safety relief valve, a fixed blowdown valve, etc.) in accordance with teachings of this disclosure. The relief valve 100 of the illustrated example includes a valve body 102 (e.g., valve body), a nozzle 104 and an adjustor assembly 106. In this example, the nozzle 104 defines an inlet 108 (e.g., an inlet port or opening) and the valve body 102 defines an outlet 110 (e.g., an outlet port or opening). The inlet 108 provided by the nozzle 104 includes an aperture to fluidly couple the relief valve 100 and a pressurized fluid upstream from the relief valve 100. In this particular example, the relief valve 100 is implemented as a pressure relief valve that is utilized with a fluid, such as a gas, for example. The nozzle 104 of the illustrated example includes a fitting 104*a*. In the illustrated example, the nozzle 104 and the fitting 104*a* is a single or unitary structure (e.g., a one-piece nozzle). However, in other examples, the nozzle 104 and the fitting 104*a* can be two or more components or structures (e.g., a two-piece structure). The fitting 104*a* can be, for example, an NPT fitting (e.g., a ½ inch NPT fitting) and/or any other fitting to fluidly couple a fluid system to the relief valve 100. The upstream system can be, for example, a tank and/or other pressurized process fluid. In operation, a pressure of fluid at the nozzle 104 exceeding a threshold pressure (e.g., set via the adjustor assembly 106) causes the relief valve 100 to open to allow fluid to flow from the nozzle 104 to the outlet 110 (e.g., to relieve pressure of the system and/or process fluid upstream from the relief valve 100). Although the relief valve 100 of the illustrated example is a pressure relief valve, example valve seat assemblies disclosed herein can be employed with globe valves, rotary valves, and/or any other type of fluid valve having a poppet or valve seat.

Figure 2:
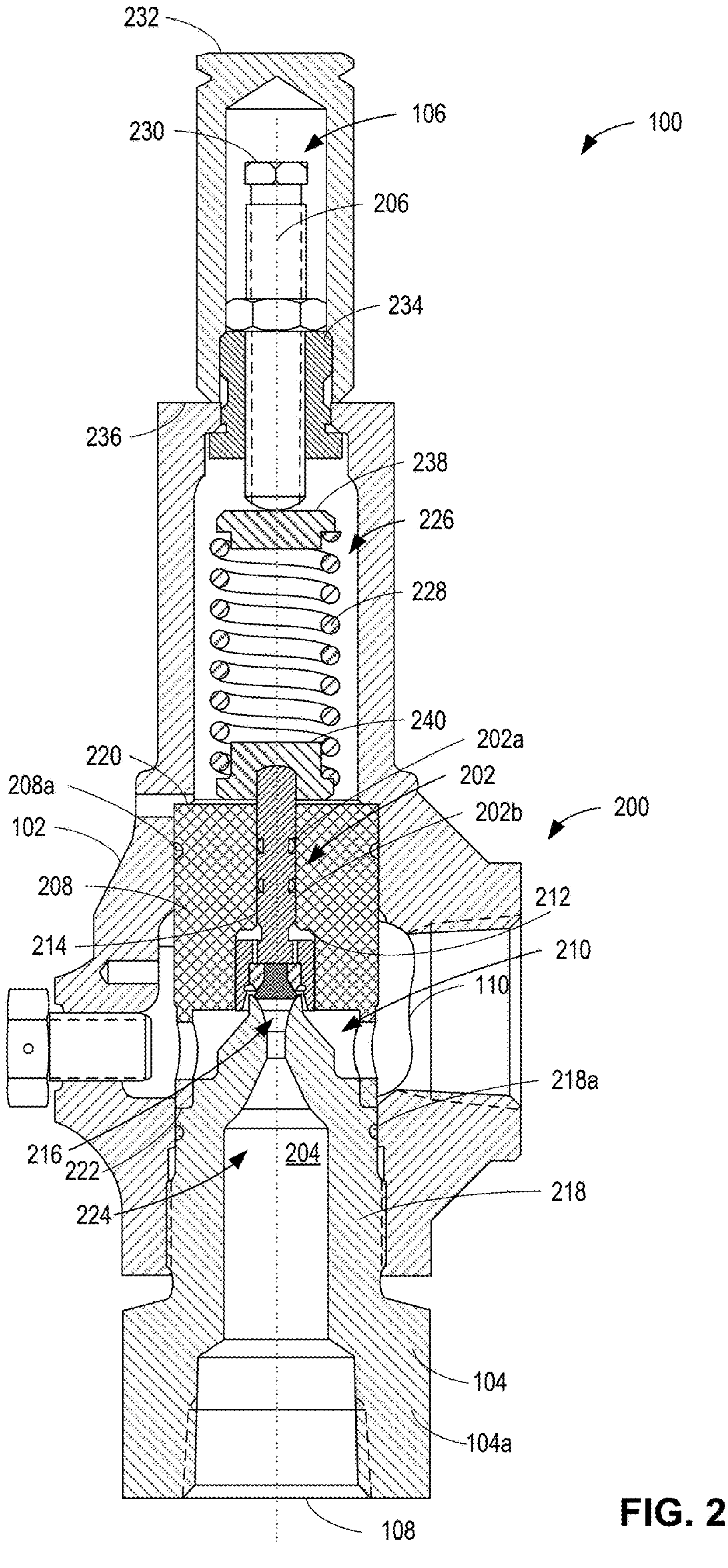
FIG. 2 is a cross-sectional view of the example relief valve shown in FIG. 1 with an example valve seat assembly disclosed herein in an example closed position.

FIG. 2 is a cross-sectional view of the example relief valve 100 shown in FIG. 1 with an example valve seat assembly 202 in accordance with teachings of this disclosure. The example relief valve 100 of FIG. 2 is shown in an example closed position 200. In the illustrated example of FIG. 2, the valve body 102 defines a fluid flow passageway 204 between the inlet 108 and the outlet 110. In the closed position 200, fluid flow is prevented between the inlet 108 and the outlet 110. To control fluid flow through the fluid flow passageway 204, the relief valve 100 includes the valve seat assembly 202 and the nozzle 104. The valve seat assembly 202 of the illustrated example is interposed in the fluid flow passageway 204 between the inlet 108 and the outlet 110. To retain and align the valve seat assembly 202 (e.g., centrally with a longitudinal axis 206) in the fluid flow passageway 204, the relief valve 100 of the illustrated example includes a guide 208. The guide 208 of the illustrated example is a cylindrical body having a flow cavity 210, a guide recess 212, and a guide aperture 214 (e.g., that are coupled or formed by stepped surfaces). The guide 208 slidably receives the valve seat assembly 202. Specifically, the guide 208 is fixed or stationary and the valve seat assembly 202 is slidably received via the guide recess 212 and the guide aperture 214 (e.g., a center bore).

The valve seat assembly 202 moves relative to an orifice 216 of the fluid flow passageway 204 between the closed position 200 and an open position (e.g., an open position 800 of FIG. 8) based on a pressure at the inlet 108. To define the orifice 216, the relief valve 100 of the illustrated example includes the nozzle 104. The nozzle 104 of the illustrated example is positioned within the fluid flow passageway 204 and is engaged with and/or at least partially received by the flow cavity 210 of the guide 208 (e.g., guide bottom). The nozzle 104 of the illustrated example is retained in the valve body 102 via the nozzle 104, which is (e.g., threadably) coupled to the valve body 102. Thus, the valve seat assembly 202 is positioned between the guide 208 and the nozzle 104. The guide 208 is captured or retained in the fluid flow passageway 204 between a shoulder 220 of the valve body 102 and a shoulder 222 of the nozzle 104 when the nozzle 104 is coupled to the valve body 102. The nozzle 104 includes a passageway or aperture 224 (e.g., a central aperture) that defines the orifice 216 and portions of the fluid flow passageway 204 upstream from the valve seat assembly 202.

To control movement of the valve seat assembly 202 relative to the orifice 216 based on a preset pressure of the adjustor assembly 106, the relief valve of the illustrated example includes the adjustor assembly 106. The adjustor assembly 106 of the illustrated example is coupled to the valve body 102. The valve body 102 of the illustrated example defines a spring chamber 226 separate from the fluid flow passageway 204 to receive the adjustor assembly 106. The adjustor assembly 106 of the illustrated example includes a biasing element 228 and an adjusting screw 230. A cap 232 (e.g., a cover) covers (e.g., protects) the adjusting screw 230. The cap 232 and the adjusting screw 230 are coupled to the valve body 102 via an insert 234 (e.g., a fastener, a nut, a screw, etc.). The adjusting screw 230 is (e.g., threadably) coupled to an aperture of the insert 234, and the insert 234 is coupled to an aperture at an upper surface 236 of the valve body 102. For example, the insert 234 is press-fit into the valve body 102 via a press, a clamp, and/or any other manufacturing process(es) or technique(s). The biasing element 228 of the illustrated example is positioned in the spring chamber 226. Specifically, the biasing element 228 of the illustrated example is captured between a first spring seat 238 (e.g., upper spring washer) and a second spring seat 240 (e.g., a lower spring washer) opposite the first spring seat 238. The adjusting screw 230 of the illustrated example moves relative to the insert 234 in a rectilinear direction (e.g., up and down direction in the orientation of FIG. 2) along the longitudinal axis 206 of the relief valve 100 to adjust (e.g., compress or decompress) a force output of the biasing element 228 and/or adjust (e.g., increase or decrease) a set pressure of the relief valve 100. In the illustrated example, the adjusting screw 230 engages the first spring seat 238 to adjust (e.g., compress or decompress) a position of the biasing element 228 relative to the second spring seat 240. The second spring seat 240 is operatively coupled to the valve seat assembly 202. To prevent fluid leakage to the atmosphere along an outer surface of the nozzle 104, the nozzle 104 of the illustrated example includes a first seal 218*a* (e.g., an O-ring). To prevent fluid leakage from the fluid flow passageway 204 toward the spring chamber 226 along an outer surface of the guide 208, the guide 208 of the illustrated example has a second seal 208*a* (e.g., an O-ring). To prevent fluid leakage from the fluid flow passageway 204 toward the spring chamber 226 through the guide aperture 214 of the guide 208, the valve seat assembly 202 includes a third seal 202*a* (e.g., an O-ring) and a fourth seal 202*b* (e.g., an O-ring).

Figure 3:
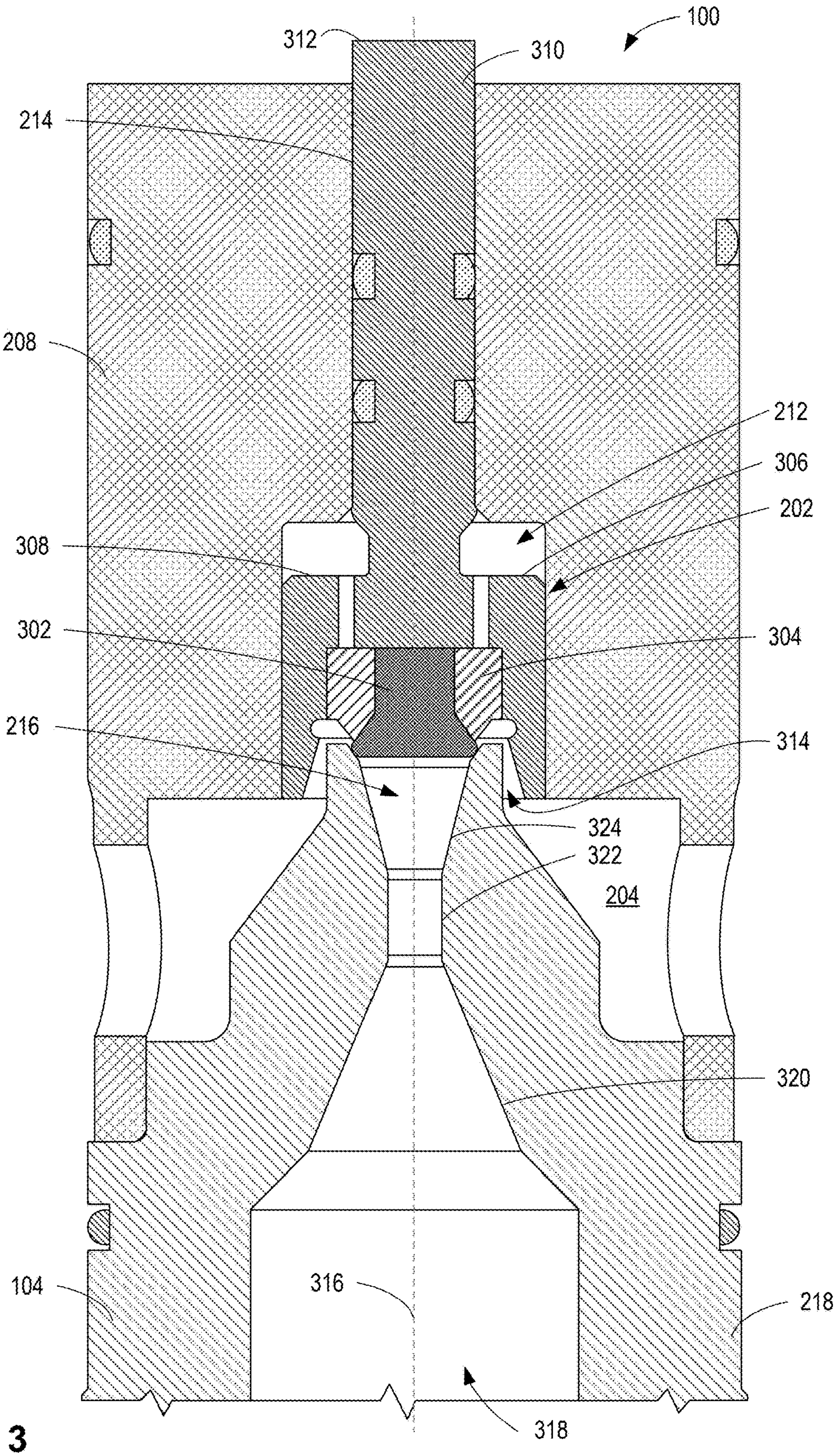
FIG. 3 is an enlarged, partial cross-sectional view of the relief valve of FIG. 2.

FIG. 3 is a partial, enlarged cross-sectional view of the example relief valve 100 of FIG. 2. The valve seat assembly 202 of the illustrated example includes a valve seat 302, a retainer ring 304, and a spindle 306. The valve seat assembly 202 of the illustrated example is received by the guide recess 212 of the guide 208. Specifically, when positioned in the valve body 102, the valve seat 302, the retainer ring 304 and the spindle 306 are slidably received or positioned within the guide recess 212 of the guide 208. The spindle 306 of the illustrated example operatively couples the valve seat 302 and the adjustor assembly 106. Specifically, the spindle 306 interacts with or engages (e.g., directly engages or couples to) the second spring seat 240 to operatively couple the biasing element 228 and the valve seat 302.

The spindle 306 of the illustrated example includes a skirt 308 (e.g., a cylindrical body portion) and a spindle stem 310 (e.g., a shaft) extending from the skirt 308. Specifically, the spindle stem 310 extends in a direction away from the skirt 308. The spindle stem 310 of the spindle 306 passes through the guide aperture 214 of the guide 208 and extends partially into the spring chamber 226. An end 312 of the spindle stem 310 of the illustrated example extends from the guide 208 and couples to (e.g., engages) the second spring seat 240 of the adjustor assembly 106. When coupled to the guide 208, the guide aperture 214 of the guide 208 slidably receives the spindle stem 310 of the spindle 306 and the guide recess 212 slidably receives the skirt 308 of the spindle 306. Thus, the valve seat 302 engages and seals against the nozzle 104 via the biasing element 228 and the spindle 306 to prevent fluid flow through the fluid flow passageway 204 (e.g., when a pressure of the fluid at the orifice 216 does not overcome the spring force for the biasing element 228). When pressure at the orifice 216 is greater than the preset pressure of the spring force provided by the biasing element 228 of the adjustor assembly 106, the valve seat 302 moves away from the nozzle 104 to allow fluid flow through the fluid flow passageway 204.

The skirt 308 of the illustrated example includes a cavity 314 to receive the retainer ring 304 and the valve seat 302. For example, the retainer ring 304 is positioned between the valve seat 302 and the spindle 306 when the retainer ring 304 and the valve seat 302 are positioned in the cavity 314 of the skirt 308. Specifically, the valve seat 302 is fixed to the retainer ring 304 via a press-fit, and the retainer ring 304 is coupled to the spindle 306 via a clearance fit connection. The retainer ring 304 guides and/or aligns the valve seat 302 relative to the orifice 216 (e.g., a longitudinal axis 316 of the orifice 216). In other words, the retainer ring 304 aligns (e.g., coaxially aligns) the valve seat 302 relative to the longitudinal axis 316. Specifically, the retainer ring 304 allows the valve seat 302 to float or move in a radial direction to enable the valve seat 302 to self-align relative to the orifice 216 and/or the nozzle 104. As a result, the valve seat assembly 202 can be manufactured with less tolerance restrictions, thereby decreasing manufacturing time and/or costs. Additionally, the retainer ring 304 prevents or restricts over compression of the valve seat 302 when the valve seat assembly 202 is in the closed position 200 and/or during assembly of the valve seat assembly 202. As used herein, a floating valve seat means that neither the valve seat 302 nor the retainer 304 is fixed to the spindle 306. In other words, the retainer 304 and the valve seat 302 can move relative to the spindle 306.

Figure 4:
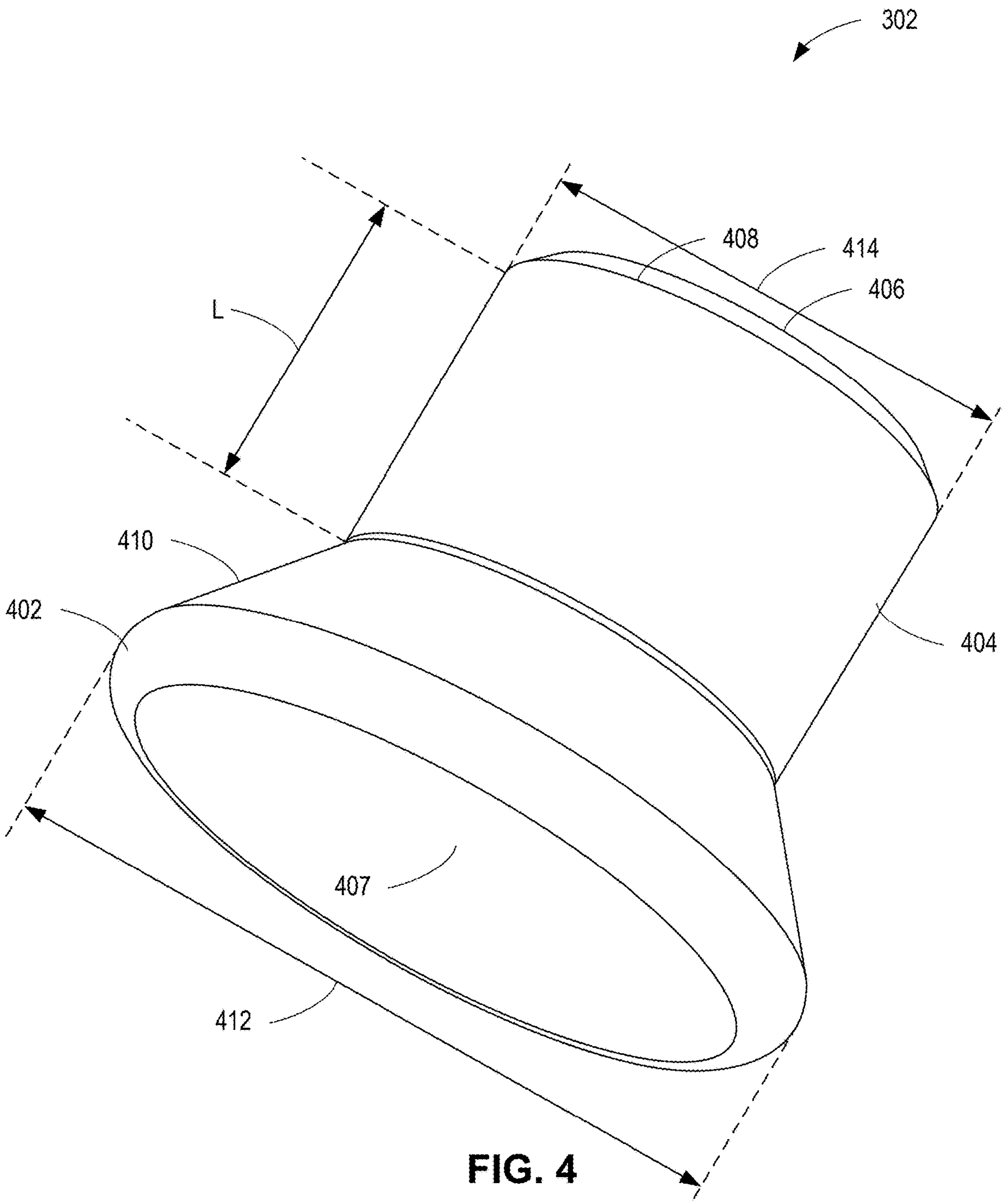
FIG. 4 is a perspective view of an example valve seat of the example valve seat assembly of FIG. 2.

The nozzle 104 of the illustrated example has an aperture or flow path 318 that defines a portion of the fluid flow passageway 204 when coupled to the valve body 102. The flow path 318 of the nozzle 104 of the illustrated example includes a convergent-divergent profile. For example, the flow path 318 has a first or converging portion 320 (e.g., a converging profile), a second or straight portion 322 (e.g., a non-converging or non-diverging profile), and a third or diverging portion 324 (e.g., a diverging profile). The divergent-convergent profile of the flow path 318 provides an increased pressure or force to act on the valve seat 302 for smaller diameter relief valves (e.g., relief valves having inlet and outlet diameters less than one inch (e.g., 0.25 inches, 0.5 inches, etc.)). For instance, the converging portion 320 increases a velocity and decreases a pressure of the fluid passing through the nozzle 104. In turn, the diverging portion 324 decreases a velocity and increases a pressure of the fluid passing through the nozzle 104. The increased pressure at the diverging portion 324 of the nozzle 104 improves an opening-speed performance of the relief valve 100 when the process fluid is a liquid. In some examples, the nozzle 104 does not include the convergent-divergent profile. For example, a nozzle having a straight flow path can be employed in other examples. In some examples, the nozzle 104 can be replaced with a different nozzle having a straight flow profile and/or any other suitable flow profile(s). FIG. 4 is a perspective view of the valve seat 302 of FIG. 3. The valve seat 302 of the illustrated example has a seating surface 402 and a valve seat stem 404 (e.g., a shaft). The valve seat stem 404 extends away from the seating surface 402 (e.g., extends in an opposite direction from the seating surface 402). Specifically, an end 406 of the valve seat stem 404 of the valve seat 302 is opposite another end 407 adjacent the seating surface 402. Thus, the end 406 is spaced from the seating surface 402. The end 406 of the valve seat stem 404 couples to the spindle 306. The end 406 of the illustrated example has a lead-in surface 408 (e.g., a chamfer) to facilitate insertion of the valve seat 302 and the retainer ring 304. The valve seat 302 has a transition surface 410 (e.g., a tapered surface) extending between the valve seat stem 404 and the seating surface 402. The transition surface 410 provides a transition between the seat surface 402 and the valve seat stem 404. The valve seat 302 of the illustrated example is a cylindrical body. The seating surface 402 and the valve seat stem 404 have circular shapes. The seating surface 402 has an outer diameter 412 that is greater than an outer diameter 414 of the valve seat stem 404. The outer diameter 412 is greater than the outer diameter 414. Additionally, the valve seat stem 404 has a length L between the transition surface 410 and the end 406. In some examples, a ratio between the outer diameter 412 of the seating surface 402 and the length L of the valve seat stem 404 can be between, for example, a range of 1.5:1 and 2.5:1 (e.g., 2.12:1) and/or any other ratio.

Figure 5A:
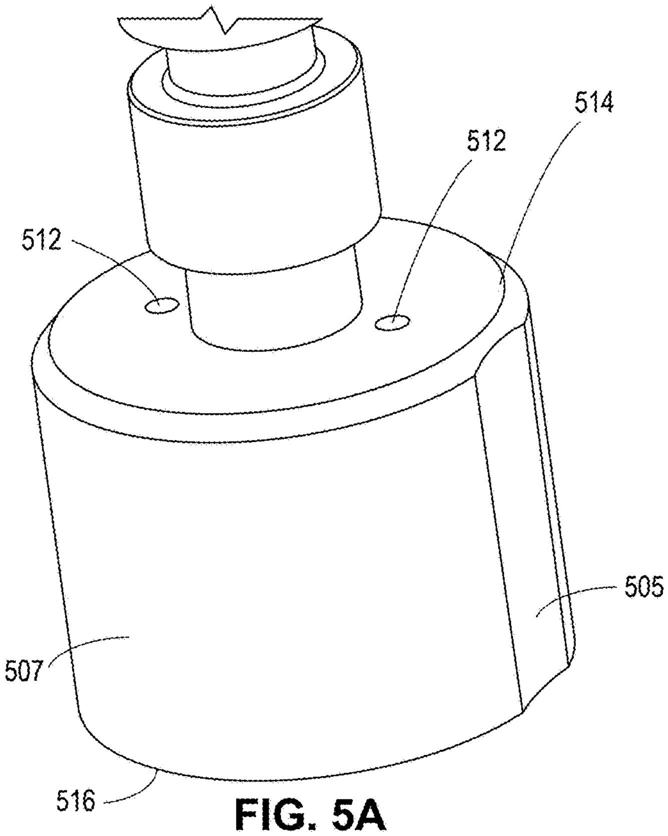
FIG. 5A is a perspective view of an example spindle of the example valve seat assembly of FIG. 2.
Figure 5B:
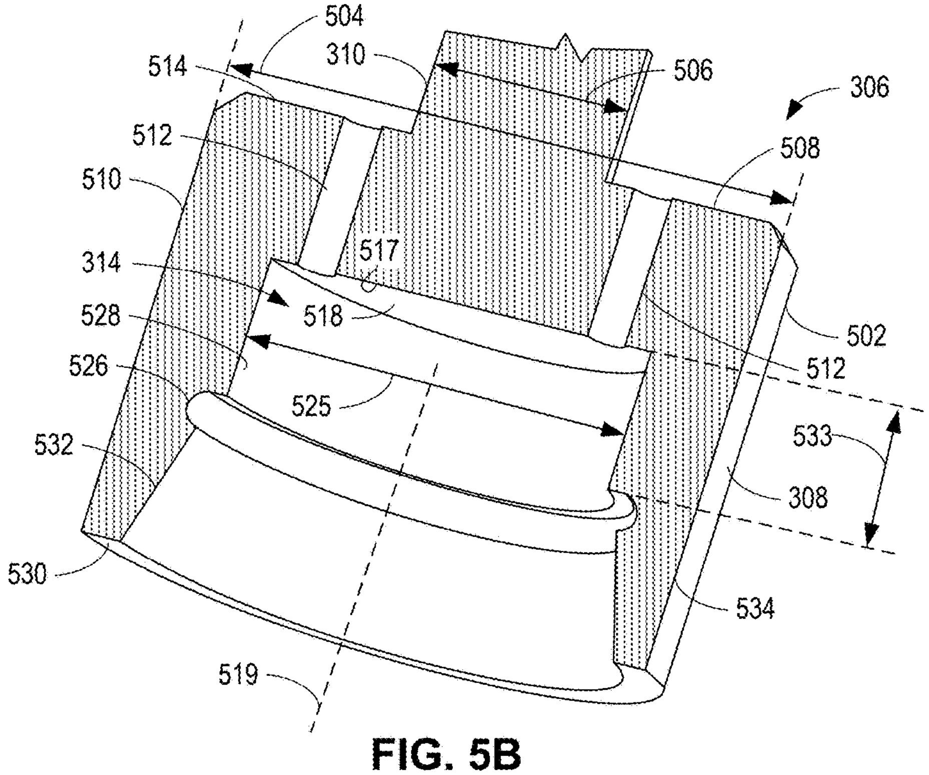
FIG. 5B is a perspective, cross-sectional view of FIG. 5A

FIG. 5A is a partial perspective view of the example spindle 306 of FIG. 3. FIG. 5B is a perspective, cross-sectional view of the spindle 306 of FIG. 5A. The spindle 306 of the illustrated example includes a body 502 (e.g., a substantially cylindrical body) defining the skirt 308. The spindle stem 310 extends in a direction away from the skirt 308. Referring to FIG. 5B, the skirt 308 has an outer diameter 504 that is greater than an outer diameter 506 of the spindle stem 310. The skirt 308 has an outer diameter that is less than an inner diameter of the guide 208. Additionally, the outer diameter 506 of the spindle stem 310 is less than an inner diameter of the guide aperture 214 of the guide 208. In this manner, the spindle 306 (e.g., the skirt 308 and the spindle stem 310) can slide relative to the guide 208. Additionally, the first end 514 of the skirt 308 engages the guide 208 (e.g., a shoulder of the guide recess 212) to provide a stop (e.g., a mechanical stop) to restrict or prevent movement of the spindle 306 when the relief valve 100 moves toward the open position 800 (e.g., to limit a travel stroke of the spindle 306 and/or prevent over lifting of the spindle 306 in the upward direction) (e.g., see FIG. 8).

The skirt 308 has a base 508 and an annular wall 510 defining the cavity 314 of the spindle 306. As shown in FIG. 5A, an outer surface 507 of the skirt 308 has a longitudinal channel or recess 505 (e.g. a cutout, slot, passage or pathway) extending between the first end 514 and a second end 516 of the skirt 308 opposite the first end 514. The channel 505 provides a venting passageway for venting air above the spindle 306 and/or within the guide recess 212 during operation. Therefore, performance of the valve 100 is not affected or influenced by air or fluid rested in the guide recess 212. The base 508 of the illustrated example includes at least one longitudinal channel or bleed passage 512 (e.g., a bleed hole) extending between the first end 514 of the skirt 308 and/or the base 508 and a second end 517 of the skirt 308 and/or the base 508. In the illustrated example, the spindle 306 includes a plurality of bleed passages 512 radially spaced relative to a longitudinal axis 519 of the spindle 306. The bleed passages 512 vent fluid (air) from within the cavity 314 to exit the cavity 314 when the retainer ring 304 is positioned within the cavity 314. In the illustrated example, the bleed passages 512 vent air within the cavity 314 to facilitate engagement (e.g., direct engagement) between the retainer ring 304 and an inner surface 518 of the base 508 when the retainer ring 304 is positioned in the cavity 314. The cavity 314 of the skirt 308 has an inner diameter 525. The annular wall 510 of the skirt 308 defining the inner surface 528 and/or the cavity 314 has a length 533. To improve fluid flow performance and/or an opening response time of the relief valve 100, the skirt 308 includes an annular groove 526. Specifically, an inner surface 528 of the annular wall 510 of the skirt 308 oriented toward the cavity 314 includes the annular groove 526. Additionally, a second end 530 of the skirt 308 includes a tapered profile 532 that extends outwardly from the inner surface 528 of the annular wall 510 toward an outer surface 534 of the annular wall 510. The tapered profile 532 is positioned between the annular groove 526 and the second end 530 of the skirt 308.

Figure 6A:
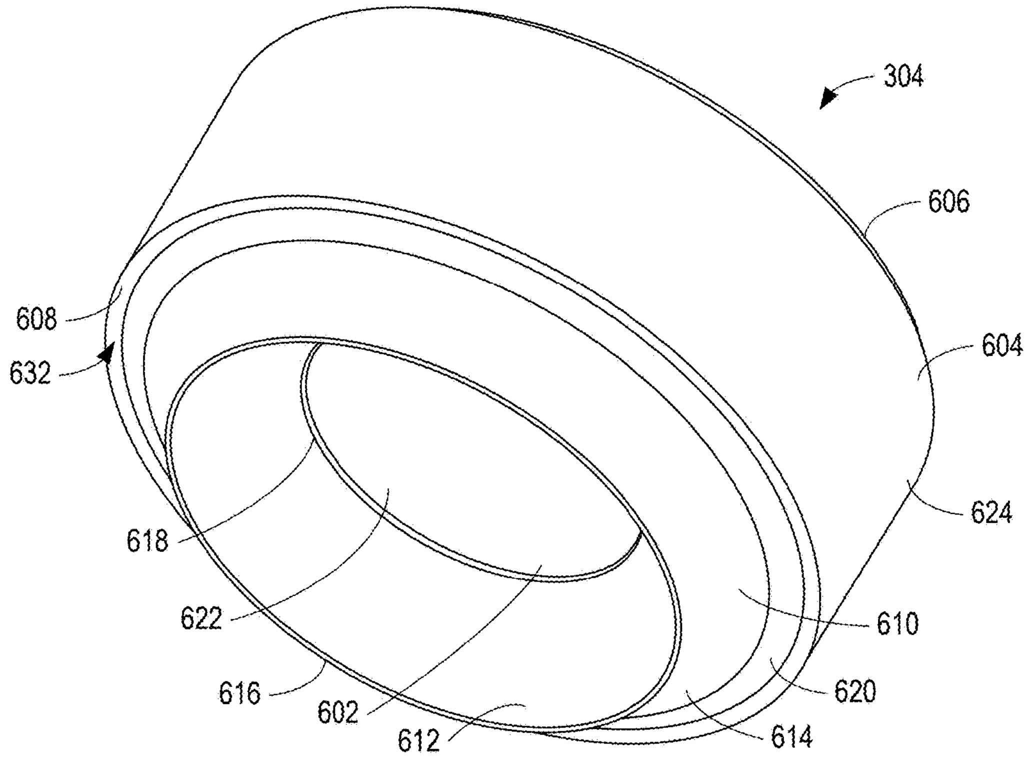
FIG. 6A is a perspective view of an example retainer ring of the example valve seat assembly of FIG. 2.
Figure 6B:
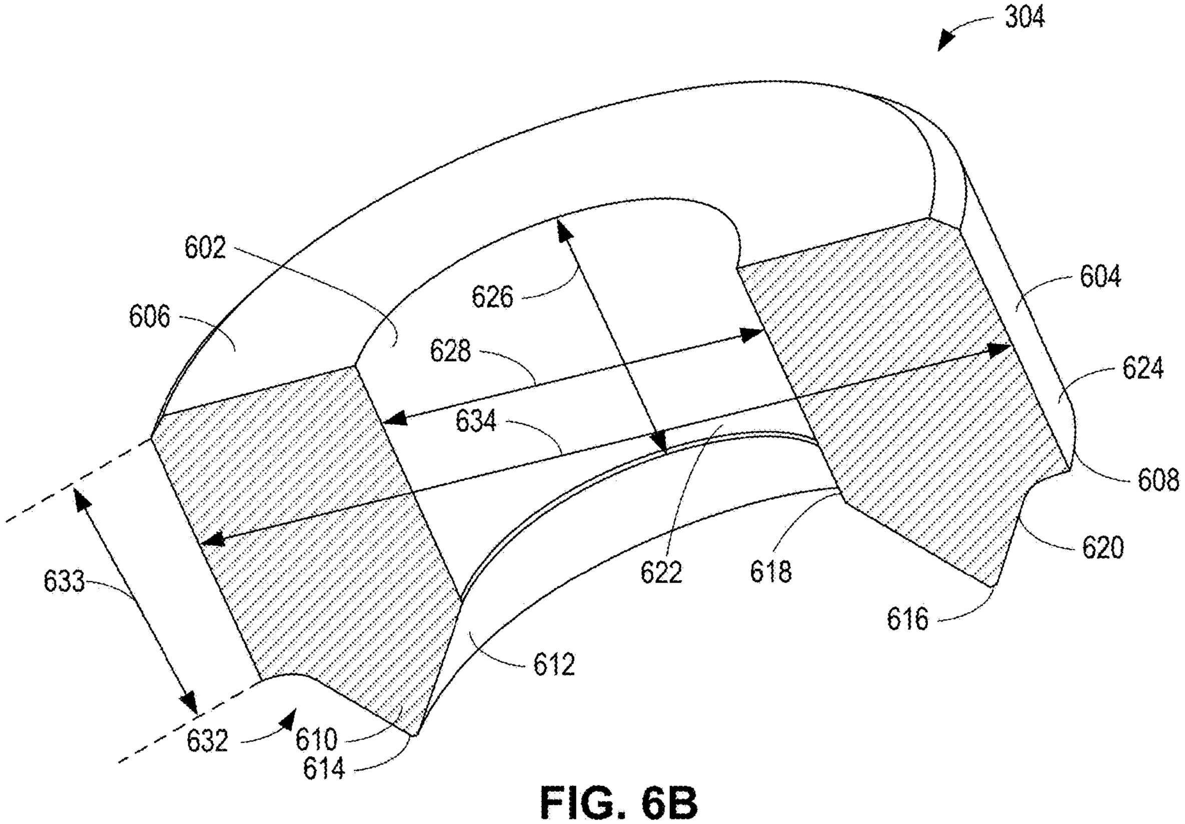
FIG. 6B is a perspective, cross-sectional view of the example retainer ring of the example valve seat assembly of FIG. 2.

FIG. 6A is a perspective view of the retainer ring 304 of FIG. 2. FIG. 6B is a perspective cross-sectional view of the retainer ring 304 of FIG. 6A. The retainer ring 304 of the illustrated example has a retainer ring opening 602 to receive the valve seat stem 404 of the valve seat 302. Specifically, the retainer ring 304 is a cylindrical body 604 having the retainer ring opening 602 extending between a first end 606 of the retainer ring 304 and/or the cylindrical body 604 and a second end 608 of the retainer ring 304 and/or the cylindrical body 604 opposite the first end 606. The retainer ring opening 602 of the retainer ring 304 receives (e.g., slidably receives) the valve seat stem 404 of the valve seat 302. The retainer ring 304 of the illustrated example includes a protrusion or lip 610 extending or protruding (e.g., downwardly) from the second end 608 (e.g., of the cylindrical body). Specifically, the lip 610 has a first tapered surface 612 and a second tapered surface 614 having respective first ends that join together (e.g., converge at an annular ridge 616) and respective second ends 618, 620 that are spaced apart. Thus, the lip 610 of the retainer ring 304 of the illustrated example forms a V-shaped profile. The first tapered surface 612 tapers from the annular ridge 616 toward an inner surface 622 of the retainer ring opening 602 and the second tapered surface 614 tapers from the annular ridge 616 toward an outer surface 624 of the cylindrical body 604. The first tapered surface 612 has an angle that is complementary to an angle of the transition surface 410 of the valve seat 302. The retainer ring opening 602 of the retainer ring 304 has a length 626 and an inner diameter 628. The retainer ring 304 has an outer diameter 634. The outer surface 624 of the cylindrical body 604 has a length 633 that is substantially similar to the length 533 of the cavity of the spindle 306 defining the inner surface 528. Thus, the cylindrical body 604 of the retainer ring 304 is received (e.g., fits within) the cavity of the annular wall 510 of the spindle 306. Additionally, the outer surface 624 of the cylindrical body 604 and/or the retainer ring 304 includes an annular notch 632. The annular notch 632 is formed adjacent the second end 620 of the second tapered surface 614. The annular notch 632 is positioned adjacent to the annular groove 526 of the spindle 306 when the retainer ring 304 couples with the spindle 306.

Figure 6C:
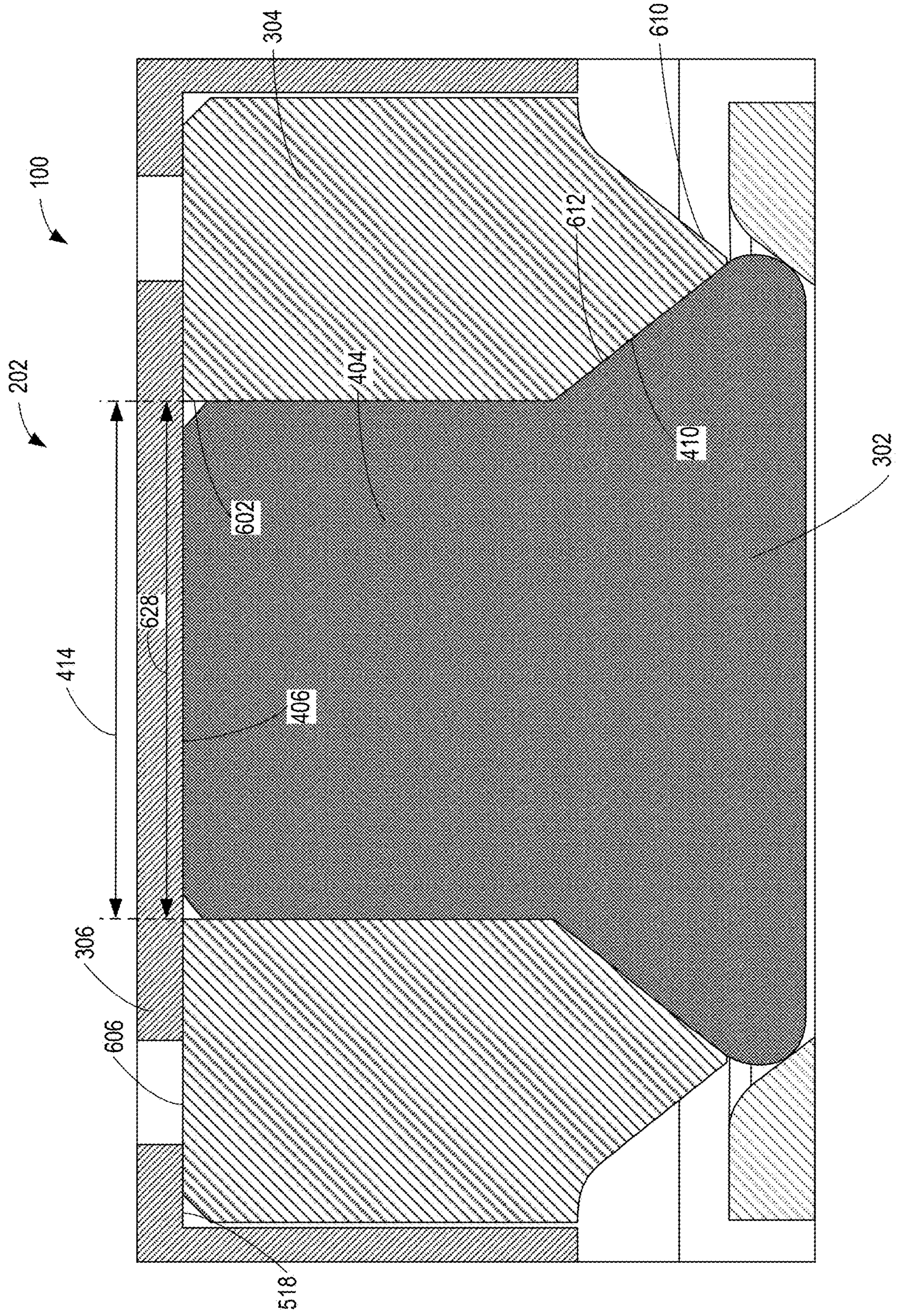
FIG. 6C is a cross-sectional view of the example valve seat and retainer ring assembled via a direct interference fit
Figure 6D:
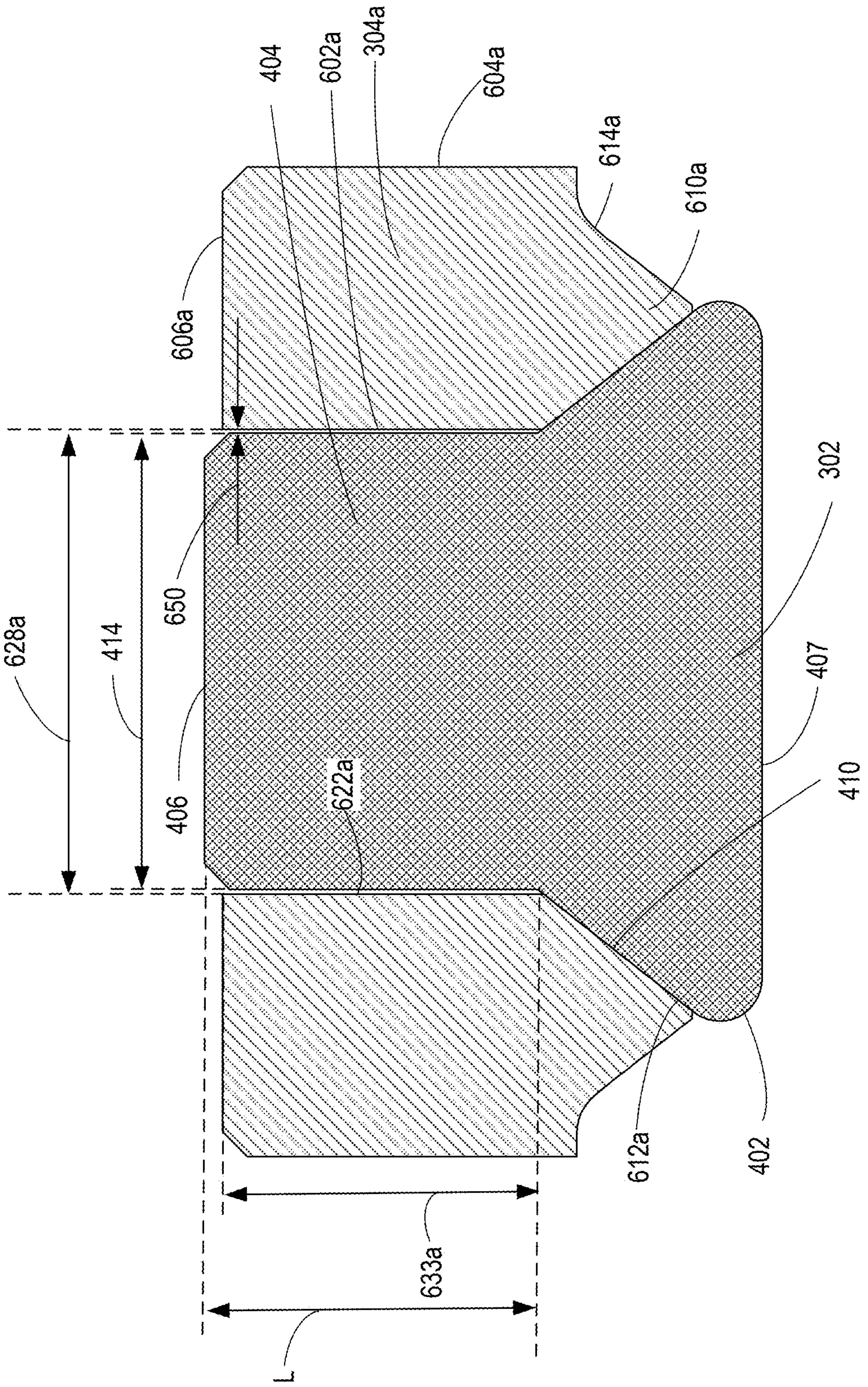
FIG. 6D is a cross-sectional view of another example valve seat disclosed herein.

The valve seat 302 is coupled to the retainer ring 304 via a press-fit connection. FIG. 6C illustrates the valve seat 302 coupled to the retainer ring 304 via a press-fit connection provided by a direct interference fit. In this example, the press-fit connection can be provided prior to assembly of the valve seat assembly 202 with the valve 100. FIG. 6D illustrates the valve seat 302 coupled to another example retainer ring 304' via a press-fit connection provided indirectly via a clearance fit. In this example, the press-fit connection can be provided after assembly of the valve seat assembly 202 with the valve 100.

Referring to FIG. 6C, to couple the valve seat 302 and the retainer ring 304, the valve seat stem 404 is press-fit with the retainer ring opening 602 of the retainer ring 304. For example, to couple the valve seat 302 and the retainer ring 304 via a direct interference, press-fit connection, the outer diameter 414 of the valve seat stem 404 is (e.g., formed) slightly larger than the inner diameter 628 of the retainer ring opening 602 of the retainer ring 304. In this manner, the valve seat stem 404 is inserted into the retainer ring opening 602 with a relatively tight-fit connection. In some examples, a tool (e.g., a hand tool, a hammer, a clamp, etc.), a press, and/or any other manufacturing process or equipment can be used to couple the valve seat 302 to the retainer ring 304 via a press-fit or friction-fit connection. For example, a tool (e.g., a hammer, a press, a clamp, etc.) can be employed to insert the valve seat stem 404 into the retainer ring opening 602 via a press-fit or friction-fit connection. The valves seat stem 404 is inserted into the retainer ring 304 until the transition surface 410 engages the first tapered surface 612 of the lip 610 of the retainer ring 304. For example, the transition surface 410 of the valve seat 302 engages (e.g., matably, or directly engages) the first tapered surface 612 of the retainer ring 304. Additionally, the end 406 of the valve seat stem 404 is substantially flush mounted or even with the first end 606 of the retainer ring 304 and/or is recessed within the retainer ring opening 602 such that the end 406 does not extend past the first end 606 of the retainer ring 304. In this manner, the first end 606 of the retainer ring 304 engages the inner surface 518 of the spindle 306. In the press-fit connection of FIG. 6C, the valve seat 302 can be coupled to the retainer ring 304 prior to installation of the valve seat 302 and the retainer ring 304 with the spindle 306 and/or the valve 100. In some examples, a tool or clamping device (e.g., a press, a spring force) can be employed to compress the valve seat 302 and the retainer ring 304 to couple the valve seat 302 and the retainer ring 304 (e.g., via press-fit connection).

FIG. 6D is a cross-sectional view of the example valve seat 302 coupled to another example retainer ring 304*a* disclosed herein. The valve seat 302 couples to the retainer ring 304*a* via a clearance fit, and subsequently couples to the retainer ring 304*a* via a press-fit connection after assembly. For example, the valve seat 302 of FIG. 6D is shown in a partially or non-compressed assembled state with the retainer ring 304*a*. The retainer ring 304*a* can be used in place of the retainer ring 304 described above. The retainer ring 304*a* of the illustrated example has a body 604*a* that has a length 633*a* that is less than the length L of the valve seat 302 such that the end 406 of the valve seat stem 404 extends past a first end 606*a* of the retainer ring 304*a*. Additionally, the outer diameter 414 of the valve stem 404 is less than an inner diameter 628*a* of a retainer ring opening 602*a* of the retainer ring 304*a*. Thus, the valve seat stem 404 initially couples to the retainer ring opening 602*a* of the retainer ring 304*a* via a clearance fit connection. In other words, when coupled to the retainer ring 304*a*, the valve seat stem 404 (e.g., an outer surface of the valve seat stem 404) and an inner surface 622*a* of the retainer ring 304 form a gap 650 therebetween. Thus, the valve seat 302 slides into the retainer ring opening 602*a* without resistance and/or without friction (i.e., without use of a tool or force). After the valve seat 302 is coupled to the retainer ring 304*a* via the clearance fit, the valve seat 302 couples to the retainer ring 304*a* via a press-fit connection when a pressure or compression force is applied to the valve seat 302 (e.g., between an end 406 of the valve seat stem 404 and the other end 407 adjacent the seating surface 402) to compress the valve seat stem 404. The compression force causes the end 406 of the valve seat stem 404 to compress and cause the valve seat stem 404 to radially expand or deform (e.g., plastically deform) outwardly toward the inner surface 622*a* of the retainer ring opening 602*a* of the retainer ring 304*a* (e.g., a long a length of the retainer ring opening 602*a*). In turn, the valve seat stem 404 deforms (e.g. plastically deforms) to frictionally engage the inner surface 622*a* of the retainer ring opening 602*a* of the retainer ring 304*a*. In other words, the end 406 of the valve seat stem 404 is flush mounted relative to the first end 606*a* of the retainer ring 304*a*. As a result, the valve seat 302 couples to the retainer ring 304*a* via a press-fit connection (e.g. achieved indirectly from a clearance fit connection to friction fit connection transition). In other words, the clearance gap 650 is filled or closed when pressure is applied to the valve seat 302. To apply a pressure to couple the valve seat 302 and the retainer ring 304*a*, the valve seat 302 and the retainer ring 304*a* are coupled with the valve 100 in the clearance fit state as shown in FIG. 6D. Once the valve 100 is assembled with the nozzle 108 and the valve seat assembly 202 is retained within the valve body 104, a spring force from the biasing element 228 and/or pressure from fluid at the inlet 108 causes the valve seat 302 to compress and, therefore, deform (e.g., plastically deform horizontally or radially) to cause gap 650 to be filled with the stem 404, which frictionally engages the inner surface 622*a* of the retainer ring 304*a*. Once coupled together, the transition surface 410 of the valve seat 302 engages or interfaces with (e.g., matably and/or directly engages) the first tapered surface 612*a* of the lip 610*a*.

Figure 7:
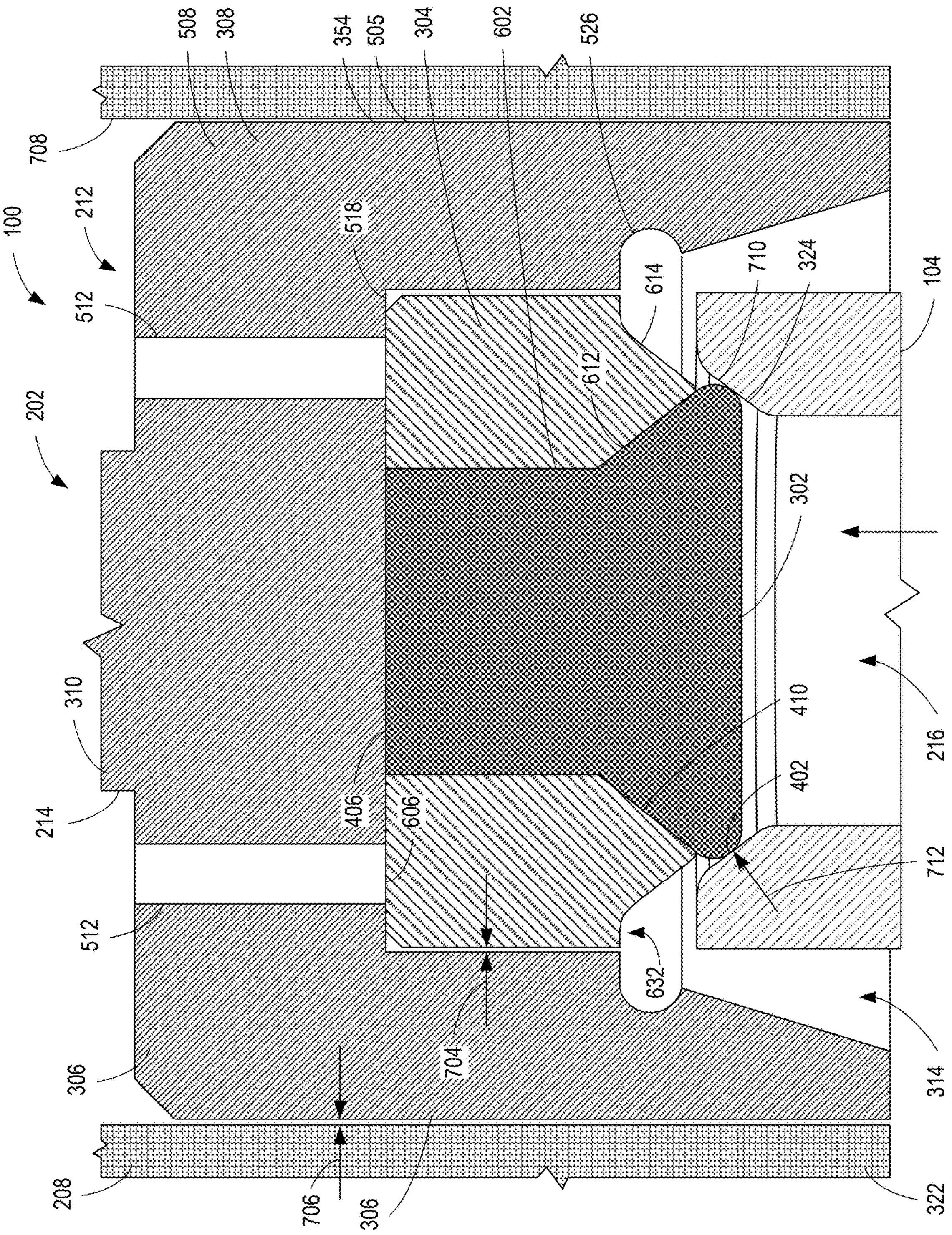
FIG. 7 is an enlarged, partial cross-sectional view of the example valve seat assembly of FIG. 2.

FIG. 7 is an enlarged, partial cross-sectional view of the relief valve 100 of FIG. 2. Referring to FIG. 7, to assemble the valve seat assembly 202, the retainer ring 304 is positioned (e.g., inserted) in the cavity 314 of the spindle 306. The bleed passages 512 of the spindle 306 enable air within the cavity 314 to vent from the cavity 314 to enable the first end 606 of the retainer ring 304 to engage (e.g., directly engage) the inner surface 518 of the base 508. The valve seat 302 is positioned in the retainer ring opening 602 of the retainer ring 304 (e.g., via press-fit connection). Additionally, the transition surface 410 of the valve seat 302 engages (e.g., matably, or directly engages) the first tapered surface 612 of the retainer ring 304. With the valve seat stem 404 positioned within the retainer ring opening 602, the valve seat 302 and the retainer ring 304 are coupled to the spindle 306. Specifically, the retainer ring 304 is positioned between the seating surface 402 of the valve seat 302 and the spindle 306. Thus, neither the retainer ring 304 nor the valve seat 302 are coupled to the spindle 306 via a fastener (e.g., a screw). Thus, the retainer ring 304 and the valve seat 302 can move relative to the spindle 306. However, the retainer ring 304 and the valve seat 302 are contained within the cavity 314 of the spindle 306.

In turn, the retainer ring 304 couples to the spindle 306 via a clearance fit. In other words, a gap 704 is provided between the outer surface 624 of the retainer ring 304 and the inner surface 528 of the cavity 314 of the spindle 306. Thus, the retainer ring 304 can be easily removed from the spindle 306. The retainer ring 304, when coupled to the spindle 306, restricts or prevents over compression of the valve seat 302 (e.g., in the vertical direction) when the valve seat 302 is coupled to the spindle 306 and/or when the valve seat 302 is in the closed position 200. Additionally, the clearance fit connection between the spindle 306 and the retainer ring 304 allows the valve seat 302 to self-align relative to the orifice 216. In other words, the gap 704 enables the retainer ring 304 to move within the cavity 314 of the spindle 306.

After the valve seat assembly 202 is assembled, the valve seat assembly 202 is slidably coupled to the guide 208. The valve seat assembly 202 is coupled to the guide 208 via a clearance fit connection. In other words, a gap 706 is provided between the outer surface 534 of the skirt 308 and an inner surface 708 of the guide 208. Additionally, the spindle stem 310 slidably moves within the guide aperture 214. The guide 208 can be positioned in the valve body 102 prior to coupling the valve seat assembly 202 and the guide 208. The guide 208 and/or the valve seat assembly 202 can be coupled to the valve body 102 via the inlet 108. The nozzle 104 is then inserted in the valve body 102. The nozzle 104 retains the guide 208 and the valve seat assembly 202 within the valve body 102.

The nozzle 104 of the illustrated example includes the flow path 318 having the converging portion 320 and the diverging portion 324 adjacent the orifice 216. The valve seat 302 (e.g., the seating surface 402) engages a tapered wall 710 of the diverging flow path 318 of the nozzle 104 adjacent the orifice 216 when the valve seat 302 is in the closed position 200. In this manner, the seating surface 402 of the valve seat 302 aligns with a vector or direction of an opening force 712 provided by pressurized fluid at the inlet 108. Aligning the orientation of the seating surface 402 in alignment with a direction of the opening force 712 can extend a service life of the seating surface 402 and, thus, the valve seat 302. Additionally, when the valve seat 302 is coupled to the retainer ring 304 and the retainer ring 304 is coupled to the spindle 306, the annular notch 632 of the retainer ring 304 aligns (e.g., vertically aligns) with the annular groove 526 of the spindle 306. Thus, the retainer ring 304 does not interfere with the annular groove 526 during operation. The annular groove 526 is provided to increase a volume capacity of the fluid flow passageway 204 adjacent to the orifice 216 when the valve seat 302 begins to move away from the orifice 216 and/or the nozzle 104. Int this matter, the annular groove 526 provides a gush effect that increases an opening response time of the relief valve 100, thereby improving its performance characteristic(s). The annular groove 526 of the spindle 306 is formed via machining.

The spindle 306 and/or the retainer ring 304 (e.g., and/or the retainer ring 304*a*) of the illustrated example can be composed of metal such as, for example, steel, stainless steel, an alloy, and/or any other metal material(s). The valve seat 302 can be composed of a rubber or plastic material including, for example, polyamide-imide (PAI) (e.g., Torlon® (4203L), polytetrafluoroethylene (PTFE), polychlorotrifluoroethylene (PCTFE), polyether ether ketone (PEEK), and/or any other rubber or plastic material(s)). The valve seat 302 is replaceable. In some examples, the valve seat assembly 202 can be retrofit existing valves in the field. Thus, in some examples, the valve seat assembly 202 can be provided as a replacement kit.

Figure 8:
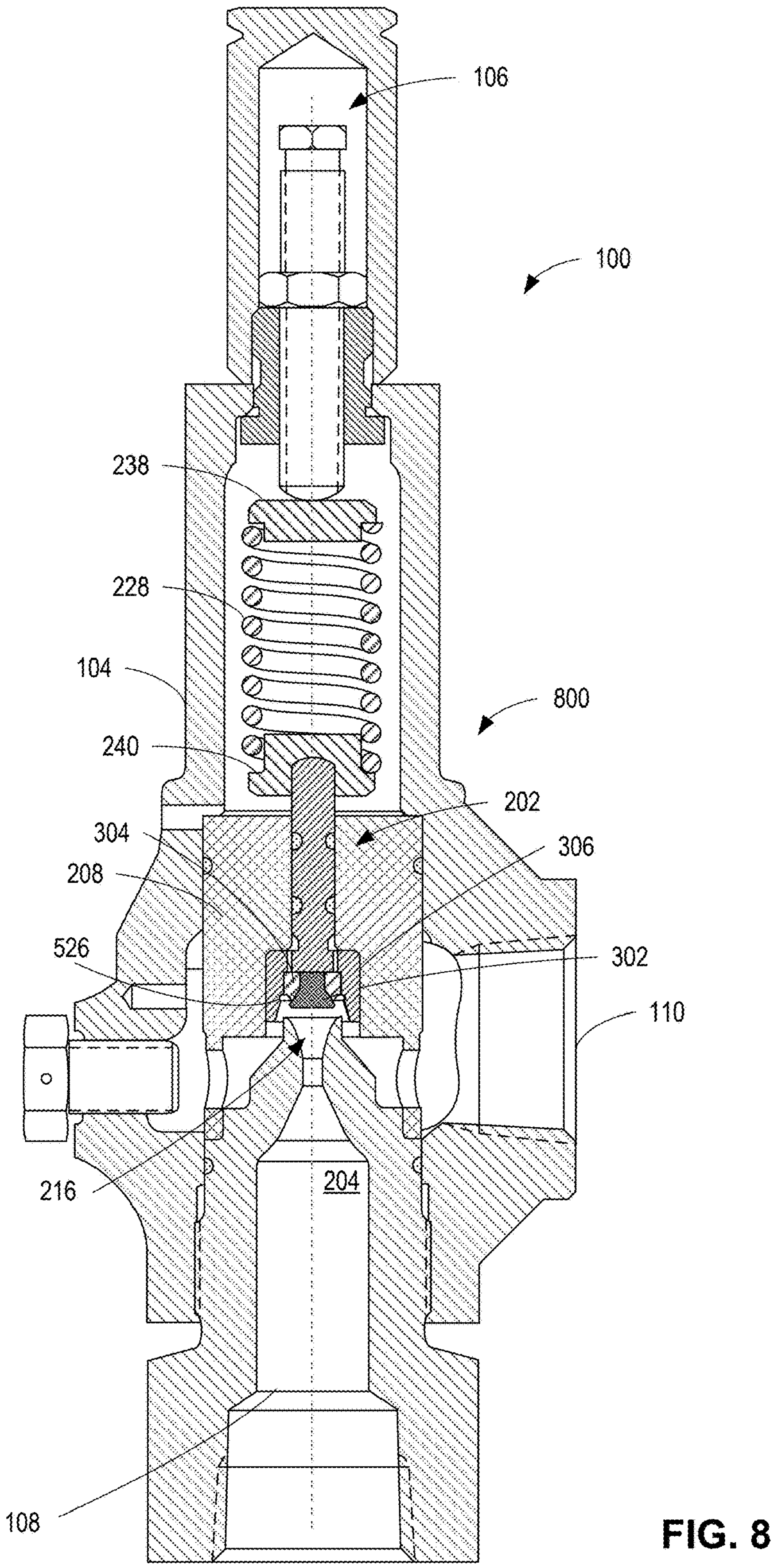
FIG. 8 is a cross-sectional view of the relief valve of FIG. 2 with the example valve seat assembly in an example open position.

FIG. 8 is a cross-sectional view of the example relief valve 100 of FIG. 2 in an example open position 800. In operation, to open/close the relief valve 100, fluid, such as a gas or liquid, flows into the fluid flow passageway 204 via the inlet 108 and toward the valve seat 302. In particular, when a pressure of the fluid imparted against the valve seat 302 does not exceed a force of the biasing element 228 exerted onto the second spring seat 240 and, in turn, on the spindle 306, the valve seat 302 engages the nozzle 104 and the relief valve 100 is in the closed position 200 to prevent or restrict fluid flow through the fluid flow passageway 204 between the inlet 108 and the outlet 110. In other words, the biasing element 228 imparts a force to the valve seat 302 via the spindle 306 to maintain the valve seat 302 engaged with a seating surface of the nozzle 104.

When the pressure of the fluid at the inlet 108 exceeds the closing force provided by the adjustor assembly 106, the pressure of the fluid imparts a force to the valve seat 302 and causes the valve seat 302 to move in a direction away from the nozzle 104 to move the relief valve 100 to the open position 800 to allow fluid flow between the inlet 108 and the outlet 110. The upward movement (in the orientation of FIG. 8) of the valve seat 302, which is coupled by the spindle 306, causes the biasing element 228 to compress (e.g., cause the second spring seat 240 to move toward the first spring seat 238). In turn, the valve seat 302, the retainer ring 304 and the spindle 306 move in a direction away from the nozzle 104 (e.g., the orifice 216) to enable fluid to flow through the fluid flow passageway 204 between the inlet 108 and the outlet 110. In other words, the pressure of the fluid exceeding a threshold (e.g., a pressure threshold, a spring force threshold, etc.) enables fluid to flow from the inlet 108 to the outlet 110. According to some examples disclosed herein, the force of the biasing element can be adjusted via the adjusting screw 230 to vary a pressure (e.g., a set pressure) at which the relief valve 100 opens/closes. The spindle 306 engages the guide 208 to limit travel or movement of the valve seat assembly 202 when the valve seat assembly 202 moves toward the open position 800. Furthermore, the bleed holes 512 of the spindle 308 and/or the channel 505 of the skirt 308 of the spindle 308 enables air or fluid from within the guide cavity 212 to vent to improve an opening speed and/or operation of the valve 100.

Additionally, for incompressible fluids (e.g., liquids), liquid cannot expand to assist with lifting of the valve seat 302. A direct acting relief valve such as the relief valve 100 initially uses reactive forces and then momentum forces to enable the valve seat 302 to lift during an over pressurization event. As the valve seat 302 cracks open or is between a fully closed position (e.g., the closed position 200) and a fully open position (e.g., the open position 800), the skirt 308 directs the fluid (e.g., a liquid) downward in the orientation of FIG. 8 as the fluid begins to flow across the orifice 216. The annular groove 526 of the spindle 306 takes in fluid (e.g., a liquid) to effectively increase a volume adjacent the orifice 216, thereby increasing a pressure of the fluid as the fluid starts to pass through the orifice 216 and flows toward the outlet 110 (e.g., a gush-effect). As the flow of the fluid (e.g., liquid) increases with lift, an increased velocity head provides a surge in liquid flow to cause the valve seat 302 to move further toward the open position 800. The second tapered surface 614 of the lip 610 of the retainer ring 304 and/or the annular notch 632 guides the fluid flow toward the annular groove 526 when the valve seat 302 begins to decouple from the nozzle 104. Thus, the retainer ring 304 does not interfere with the annular groove 526 of the skirt 308. When the pressure of the fluid at the inlet 108 reduces to a pressure that is less than the force of the biasing element 228, the biasing element 228 expands to cause the valve seat 302 to engage the nozzle 104 to move the relief valve 100 to the closed position 200. The clearance fit connection between the retainer ring 304 and the spindle 306 enables the valve seat 302 to self-align relative to the nozzle 104 when the valve seat 302 moves to the closed position 200.

Figure 9:
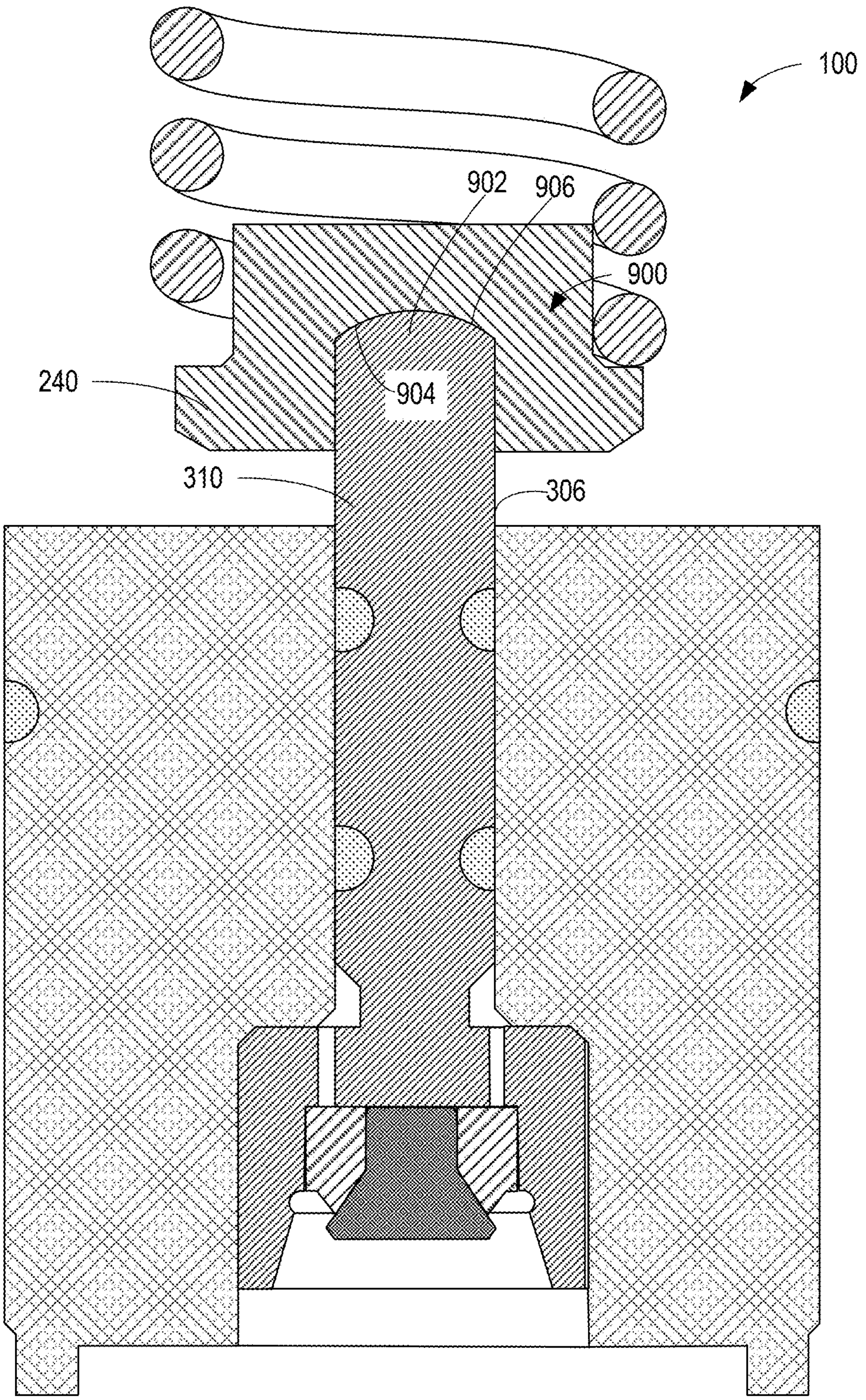
FIG. 9 is an enlarged, partial cross-sectional view of the example relief valve of FIG. 2 showing an enlarged view of a spindle and adjustor assembly interface.

FIG. 9 is an enlarged, partial cross-sectional view of the example relief valve 100 of FIG. 2 showing an enlarged view of a spindle and adjustor assembly interface 900. Specifically, the spindle stem 310 of the spindle 306 engages the second spring seat 240 of the adjustor assembly 106 to operatively couple the valve seat 302 and the adjustor assembly 106. Specifically, an end 902 of the spindle 306 of the illustrated example has an arcuate profile 904. The end 902 of the spindle 306 is received within an opening 906 of the second spring seat 240. In some examples, the opening 906 has a shape that is complementary to the arcuate profile 904 of the end 902. Thus, the arcuate profile 904 provides an arcuate or spherical surface contact interface between the second spring seat 240 and the spindle stem 310. For example, the end 902 has a radius of approximately between 0.2 and 0.3 inches (e.g., 0.25 inches). In some examples, the opening 906 is not complementary to the end 902 of the spindle stem 310.

Figure 10B:
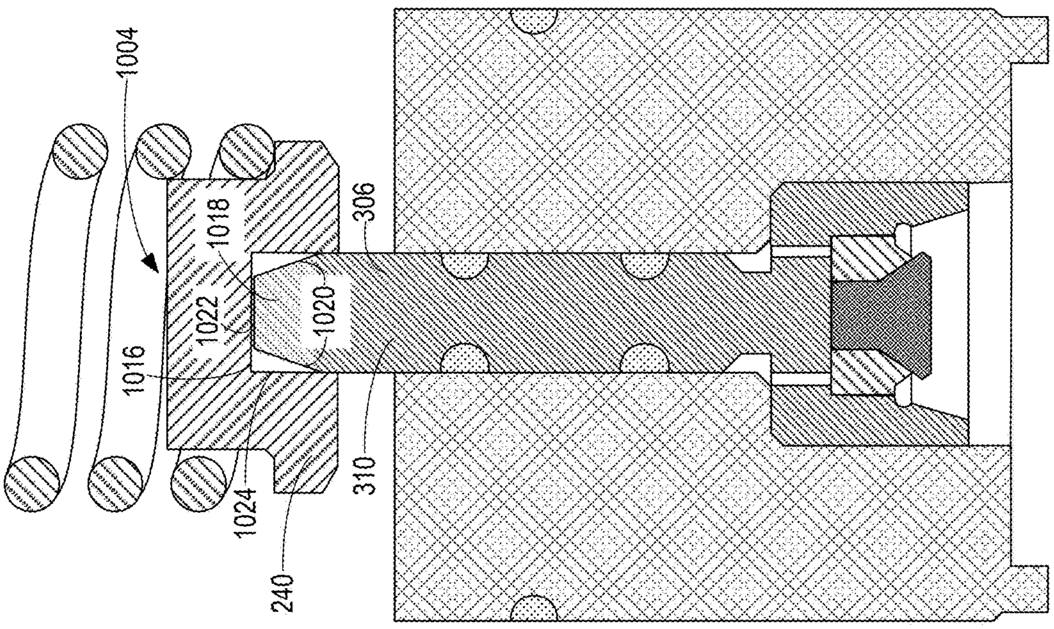
FIG. 10B is an enlarged, partial cross-sectional view of the example relief valve of FIG. 2 but having another example spindle to adjustor interface.
Figure 10A:
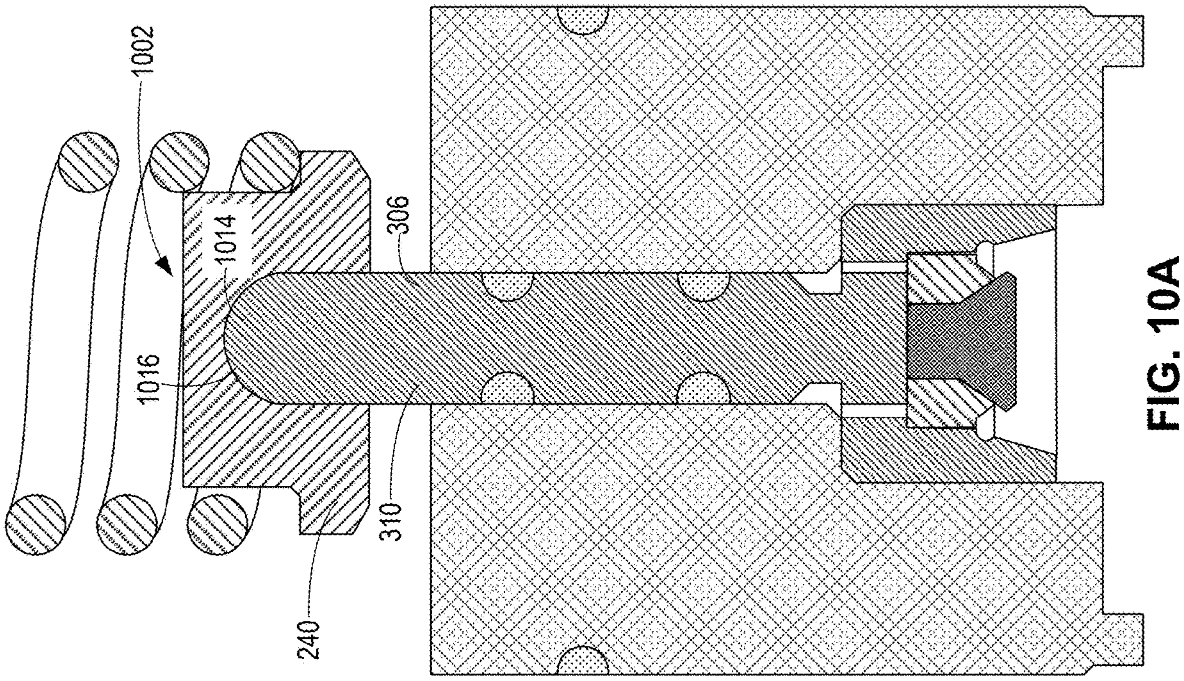
FIG. 10A is an enlarged, partial cross-sectional view of the example relief valve of FIG. 2 but having another example spindle to adjustor interface.

FIG. 10A-10B are an enlarged, partial cross-sectional view of the example relief valve 100 of FIG. 2 having other example spindle and adjustor assembly interfaces 1002-1004 disclosed herein. Referring to FIGS. 10A-10B, the spindle stem 310 of the spindle 306 engages the second spring seat 240 of the adjustor assembly 106 to operatively couple the valve seat 302 and the adjustor assembly 106.

Referring to FIG. 10A, the spindle stem 310 of the spindle 306 has a round (e.g., a semi-circular) shape and is received by an opening 1016 of the second spring seat 240. The opening 1016 of the second spring seat 240 matably receives the end 1014 of the spindle stem 310. In the illustrated example, the opening 1016 has a round shape (e.g., a semi-circular shape) to receive the end 1014. The end 1014 has a radius of curvature of approximately between 0.1 and 0.2 inches (e.g., 0.155 inches).

Referring to FIG. 10B, an end 1018 of the spindle stem 310 has a tapered edges 1020 and a flat surface 1022, where the flat surface 1022 (e.g., only the flat surface 1022) engages a surface of the opening 1024 of the second spring seat 240. Examples disclosed herein can be used or assembled to newly produced valves or valves operating in the field (e.g., in a retrofit process). The valve seat assembly 202 disclosed herein advantageously enables coupling of the valve seat 302, the retainer ring 304 and the spindle 306 without use of a fastener such as a screw, a rivet, etc. When reducing a size of the relief valve to a size that is less than one inch, formation of the annular groove 526 of the spindle 306 via machining can be complex. In some instances, reducing a diameter of the spindle 306 as a result of a smaller sized valve can cause a fastener that is typically used to couple a valve seat and a spindle to interfere with (e.g., block) the annular groove. Thus, with smaller sized valves, the fastener can interfere with the gush/surge functionality of the annular groove, which can cause inferior opening response times of the relief valve compared to the relief valve 100 disclosed herein. Eliminating use of a fastener provided by the valve seat assembly 202 disclosed herein reduces manufacturing complexities and/or prevents interference with a gush effect provided by the annular groove of the spindle 306.

Additionally, employing a fastener (e.g., a screw) to couple the valve seat and the spindle can limit an operating capacity of the relief valve because the fastener may not be capable of withstanding pressures that are greater than an operating pressure (e.g., between, for example, 10 kpsi and 15 kpsi). The example valve seat assembly disclosed herein can be used with applications having pressures that are greater than 10 kpsi.

Although each example valve seat assemblies disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below"a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

Example methods, apparatus, systems, and articles of manufacture to improve performance, manufacturing, and/or assembly of relief valves are disclosed herein. Further examples and combinations thereof include the following:

Example 1 includes an apparatus for use with a relief valve, the apparatus includes a valve seat having a seating surface and a stem, a retainer ring having a central opening to receive the stem of the valve seat, the retainer ring and the valve seat coupled via a press-fit connection, and a spindle, the retainer ring to couple to the spindle via a clearance fit connection.

Example 2 includes the apparatus as defined in example 1, wherein the stem has an outer diameter that is greater than an inner diameter of the central opening of the retainer ring.

Example 3 includes the apparatus as defined in example 1, wherein the spindle has a shaft and a skirt, the shaft extending away from the skirt, the skirt having an annular wall and a cavity to at least partially receive the retainer ring.

Example 4 includes the apparatus as defined in example 3, wherein the skirt includes at least one bleed passage formed between a first end of the skirt and a second end of the skirt.

Example 5 includes the apparatus as defined in example 4, wherein an inner surface of the annular wall of the skirt oriented toward the cavity includes an annular groove.

Example 6 includes the apparatus as defined in example 3, further including a guide, the guide having a central opening to slidably receive the shaft of the spindle and a cavity to receive at least a portion of the skirt of the spindle.

Example 7 includes the apparatus as defined in example 1, wherein the seating surface of the valve seat has a circular shape.

Example 8 includes the apparatus as defined in example 1, wherein the stem of the valve seat extends away from the seating surface.

Example 9 includes the apparatus as defined in example 1, wherein the valve seat includes a tapered surface to provide a transition between the seating surface and the stem.

Example 10 includes the apparatus as defined in example 9, wherein the retainer ring is a cylindrical body.

Example 11 includes the apparatus as defined in example 10, wherein the retainer ring includes a tapered profile.

Example 12 includes the apparatus as defined in example 11, wherein the tapered profile of the retainer ring is complimentary to the tapered surface of the valve seat.

Example 13 includes the apparatus as defined in example 1, wherein the seating surface of the valve seat has a diameter that is greater than a diameter of the stem of the valve seat.

Example 14 includes a relief valve including a valve body defining a fluid flow passageway between an inlet and an outlet, the valve body defining a spring chamber to receive a biasing element, a nozzle positioned in the valve body and defining an orifice, and a valve seat assembly interposed in the fluid flow passageway, the valve seat assembly to move relative to the orifice to control fluid flow through the fluid flow passageway, the valve seat assembly including a valve seat, a retainer ring and a spindle, the valve seat coupled to the retainer ring via press-fit connection, the retainer ring coupled to the spindle via a clearance fit connection, the retainer ring to allow the valve seat to self-align relative to the orifice.

Example 15 includes the relief valve as defined in example 14, further including a guide positioned in the valve body, the guide having a cavity to receive the valve seat assembly.

Example 16 includes the relief valve as defined in example 14, wherein the retainer ring is positioned between the valve seat and the spindle.

Example 17 includes the relief valve as defined in example 14, wherein the nozzle includes a flow path having a converging flow path and a diverging flow path adjacent the orifice.

Example 18 includes the relief valve as defined in example 17, wherein the valve seat engages a tapered wall of the diverging flow path of the nozzle when the valve seat is in a closed position.

Example 19 includes a valve seat assembly for use with a relief valve, the valve seat assembly including a seating surface having a circular shape, a stem extending from the seating surface, and a tapered surface extending between the stem and the seating surface. The valve seat assembly includes a retainer ring. The retainer ring has an opening to receive the stem. The valve seat and the retainer ring to couple via a press-fit connection between the valve stem and an inner surface defined by the central opening of the retainer ring.

Example 20 includes the valve seat as defined in example 19, wherein the seating surface has an outer diameter that is greater than an outer diameter of the stem.

From the foregoing, it will be appreciated that example systems, apparatus, articles of manufacture, and methods have been disclosed that enable accurate flow control of valves. Examples disclosed herein can also mitigate and/or reduce undesirable flow behavior of valves. Examples disclosed herein can be implemented in a cost effective manner and can also enable increased reliability of valves.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus for use with a relief valve, the apparatus comprising:

a valve seat having a seating surface and a stem;

a retainer ring having a central opening to receive the stem of the valve seat, the retainer ring and the valve seat coupled via a press-fit connection; and a spindle including a shaft and a skirt, the shaft extending away from the skirt, the skirt having an annular wall and a cavity to at least partially receive the retainer ring, the skirt including at least one bleed passage formed between a first end of the skirt and a second end of the skirt, the retainer ring to couple to the spindle via a clearance fit connection.

2. The apparatus as defined in claim 1, wherein the stem has an outer diameter that is greater than an inner diameter of the central opening of the retainer ring.

3. The apparatus as defined in claim 1, wherein an inner surface of the annular wall of the skirt is oriented toward the cavity includes an annular groove.

4. The apparatus as defined in claim 1, further including a guide, the guide having a central opening to slidably receive the shaft of the spindle and a cavity to receive at least a portion of the skirt of the spindle.

5. The apparatus as defined in claim 1, wherein the seating surface of the valve seat has a circular shape.

6. The apparatus as defined in claim 1, wherein the stem of the valve seat extends away from the seating surface.

7. The apparatus as defined in claim 1, wherein the valve seat includes a tapered surface to provide a transition between the seating surface and the stem.

8. The apparatus as defined in claim 7, wherein the retainer ring is a cylindrical body.

9. The apparatus as defined in claim 8, wherein the retainer ring includes a tapered profile.

10. The apparatus as defined in claim 1, wherein the seating surface of the valve seat has a diameter that is greater than a diameter of the stem of the valve seat.

11. An apparatus for use with a relief valve, the apparatus comprising:

- a valve seat having a seating surface and a stem, the valve seat having a tapered surface to provide a transition between the seating surface and the stem;
- a retainer ring having a central opening to receive the stem of the valve seat, the retainer ring includes a tapered profile, wherein the tapered profile of the retainer ring is complimentary to the tapered surface of the valve seat, the retainer ring and the valve seat coupled via a press-fit connection; and
- a spindle, the retainer ring to couple to the spindle via a clearance fit connection.

12. The apparatus as defined in claim 11, wherein the spindle has a shaft and a skirt, the shaft extending away from the skirt, the skirt having an annular wall and a cavity to at least partially receive the retainer ring.

13. A relief valve comprising:

- a valve body defining a fluid flow passageway between an inlet and an outlet, the valve body defining a spring chamber to receive a biasing element;
- a nozzle positioned in the valve body and defining an orifice; and
- a valve seat assembly interposed in the fluid flow passageway, the valve seat assembly to move relative to the orifice to control fluid flow through the fluid flow passageway, the valve seat assembly including a valve seat, a retainer ring and a spindle, the spindle having a cavity to receive the valve seat and an annular groove on an inner surface of the cavity, the annular groove of the spindle to receive fluid to increase a volume adjacent the orifice, the valve seat coupled to the retainer ring via a press-fit connection, the retainer ring coupled to the spindle via a clearance fit connection, the retainer ring to allow the valve seat to self-align relative to the orifice.

14. The relief valve as defined in claim 13, further including a guide positioned in the valve body, the guide having a cavity to receive the valve seat assembly.

15. The relief valve as defined in claim 13, wherein the retainer ring is positioned between the valve seat and the spindle.

16. The relief valve as defined in claim 13, wherein the nozzle includes a flow path having a converging flow path and a diverging flow path adjacent the orifice.

17. The relief valve as defined in claim 16, wherein the valve seat engages a tapered wall of the diverging flow path of the nozzle when the valve seat is in a closed position.

18. A valve seat assembly for use with a relief valve, the valve seat assembly comprising:

- a valve seat including:
  - a seating surface having a circular shape;
  - a stem extending from the seating surface;
  - a tapered surface extending between the stem and the seating surface;
- a retainer ring, the retainer ring having a central opening to receive the stem, the spindle to at least partially receive the retainer ring via the cavity, the valve seat and the retainer ring are to couple via a press-fit connection between the stem and an inner surface defined by the central opening of the retainer ring; and
- a spindle including a shaft and a skirt, the shaft extending away from a first end of the skirt, the skirt including an annular wall having a cavity, the skirt including a tapered profile that extends outwardly from an inner surface of the annular wall defining the cavity and toward an outer surface of the annular wall, the inner surface of the annular wall including an annular groove, wherein the tapered profile is between the annular groove and a second end of the skirt, the retainer ring is to couple to the spindle via a clearance fit connection.

19. The valve seat assembly as defined in claim 18, wherein the inner surface of the annular wall of the skirt is oriented toward the cavity includes the annular groove.

* * * * *